Patented May 6, 1952

2,596,041

UNITED STATES PATENT OFFICE 2,596,041

HYDROXYALKYL DERIVATIVES OF 6-AMINO - 1,2,3,4 - TETRAHYDRO - 2,4-PYRIMIDINEDIONES

Viktor Papesch, Morton Grove, Ill., assignor to G. D. Searle & Co., Chicago, Ill., a corporation of Illinois No Drawing. Application July 6, 1950, Serial No. 172,379

6 Claims. (Cl. 260—260)

1

The present invention is concerned generally with polysubstituted heterocyclic compounds, and more particularly with 6-amino-1,2,3,4-tetrahydro-2,4-pyrimidinediones substituted on one of the nuclear nitrogen atoms by an alkyl group and on the other nuclear nitrogen by a hydroxyalkyl group.

The compounds which comprise my invention have the following structural formula.

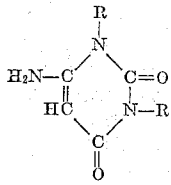

wherein one of the substituent groups R is a hydroxyalkyl radical and the other group R is an alkyl radical.

In the foregoing structural formula, one of the R groups represents a hydroxyalkyl radical wherein at least 2 carbon atoms separate the hydroxyl group and the nitrogen in the pyrimidine ring, such as β-hydroxyethyl, β-hydroxypropyl, γ-hydroxypropyl, β,γ-dihydroxypropyl, β-hydroxybutyl and the like. Acyl derivatives of such hydroxy compounds such as acetyl, propionyl, benzoyl and phenacetyl are likewise within the scope of my invention.

Among the radicals which the other R group may represent are methyl, ethyl, propyl, butyl, hexyl, benzyl, cyclopentyl, cyclohexyl and their branched-chain isomers.

It is the object of this invention to provide novel chemical substances of the foregoing type and methods for producing the same. The compounds of this invention may be prepared by a number of reactions. In one of the preferred processes, a hydroxyalkyl urea is heated with at least one equivalent of acetic anhydride and with one molecular equivalent or, preferably, with an excess of cyanoacetic acid. I find that a substantial saving in acetic anhydride can be effected by using glacial acetic acid in the process. The resulting N-hydroxyalkyl-N'-cyanoacetylurea is then cyclized and converted to the 1-hydroxyalkyl-6-amino-1,2,3,4-tetrahydro-2,4-pyrimidinedione by treatment with alkali. This product is then alkylated in the 3-position by treatment with an alkylating agent such as an alkyl halide or sulfate.

An alternative method consists of reacting a hydroxyalkylamine with an alkyl isocyanate to produce the N-hydroxyalkyl-N'-alkylurea. It is sometimes preferable to substitute a carbaminoyl chloride for the alkyl isocyanate. The resulting urea is then reacted in the same way as before with cyanoacetic acid and the cyanoacetyl derivative is ring-closed. It has been found that the cyanoacetyl group has a tendency to attach itself to the urea nitrogen which has the smallest substituent group. Thus, if the hydroxyalkyl group is larger than the alkyl group, most of the product consists of the 1-hydroxyalkyl-3-alkyl-6-amino-1,2,3,4-tetrahydro-2,4-pyrimidinedione, whereas the opposite isomer, the 1-alkyl-3-hydroxyalkyl-6-amino-1,2,3,4-tetrahydro - 2,4-pyrimidinedione, predominates where the alkyl group is the larger substituent.

In order to prepare the 1-alkyl-3-hydroxyalkyl-6-amino-1,2,3,4-tetrahydro-2,4- pyrimidinediones in which the alkyl group is small, I react the alkylurea with cyanoacetic acid, produce cyclization with alkali and alkylate the resulting 1-alkyl-6-amino-1,2,3,4-tetrahydro-2,4-pyrimidinedione in the presence of alkali with a hydroxyalkyl halide, preferably under pressure.

The compounds which comprise this invention are useful as intermediates in chemical synthesis, especially of the hydroxyalkylxanthines which are the subject of my application Serial No. 768,929, filed August 15, 1947, which has issued on August 1, 1950, as U. S. Patent No. 2,517,410 and of which the present application is a continuation-in-part. Certain of the alkylhydroxyalkylaminotetrahydropyrimidinediones of this invention have been found to possess useful therapeutic properties, particularly in improving cardio-vascular and renal function. Thus the 1-(β-hydroxyethyl)-3-methyl-6 - amino - 1,2,3,4-tetrahydropyrimidinedione, when tested in the rat for diuretic activity, by the technique of Lipschitz (Journal of Pharmacology and Experimental Therapeutics, 79:97, 1943) shows an activity comparable to that of aminophylline, being especially active at low oral dosage levels. Rotameter studies in situ in dogs show that such compounds act as coronary dilators. Some of these compounds are also useful parasiticides.

My invention is disclosed in further detail by means of the following examples which are set forth for the purpose of illustrating the invention and which are in no way to be construed as limiting the invention in spirit or in scope. It will be apparent to chemists skilled in the art that many modifications in reagents and conditions can be adopted without departing from the intent and purpose of this invention. In the following examples, temperatures will be given in degrees centigrade (°C.), relative amounts of materials in grams (g.) and milliliters (ml.) and pressures during vacuum distillation in millimeters (mm.) of mercury.

EXAMPLE 1

*1 - (β - hydroxyethyl) - 3 - methyl - 6 - amino - 1,2,3,4-tetrahydro-2,4-pyrimidinedione*

200 grams of 1-(β-hydroxyethyl)-6-amino-1,2,3,4-tetrahydro-2,4-pyrimidinedione are dissolved in 60 ml. of 50% sodium hydroxide solution and 600–700 ml. of water. The solution is stirred while 127 ml. of dimethyl sulfate are added portionwise. Near the end of the addition the mixture reaches a temperature of about 90–100° C. and has to be cooled before the rest of the dimethyl sulfate is added. Then a small amount of alkali is added to make the mixture weakly alkaline. When the addition is complete the mass is cooled and filtered. The filter cake is washed by suspension in ice water and filtration. Upon recrystallization from water using charcoal as a clarifying aid, the 1-(β-hydroxyethyl) - 3 - methyl - 6 - amino - 1,2,3,4 - tetrahydro-2,4-pyrimidinedione is obtained in colorless crystals which melt at about 219–221° C.

EXAMPLE 2

*1 - methyl - 3 - (β - hydroxyethyl) - 6 - amino - 1,2,3,4-tetrahydro-2,4-pyrimidinedione*

70 g. of 1-methyl-6-amino-1,2,3,4-tetrahydro-2,4-pyrimidinedione and 60 g. of ethylene chlorohydrin are heated together in a closed vessel at 120° C. in the presence of 30 g. of sodium hydroxide in 500 ml. of water for 2.5 hours. The charge is filtered and the filter cake is washed with water and dried. The solid 1-methyl-3-(β-hydroxyethyl)-6-amino - 1,2,3,4 - tetrahydro-2,4-pyrimidinedione thus obtained is recrystallized from water with the aid of activated charcoal. Such 1 - methyl - 3 - (β-hydroxyethyl)-6-amino - 1,2,3,4 - tetrahydro - 2,4 - pyrimidinedione melts at about 213–215° C.

EXAMPLE 3

*N-ethyl-N'-hydroxyethylurea*

To a cooled solution of 67 g. of ethanolamine in 300 ml. of chloroform there is gradually added a solution of 82 g. of ethyl isocyanate in 300 ml. of benzene. During the addition the temperature is maintained at about 20° C. The solvent is then removed in vacuo, the residual syrup solidifying to give the desired N-ethyl-N'-hydroxyethylurea. On recrystallization from a mixture of absolute alcohol and petroleum ether, the product separates as colorless, slightly hygroscopic needles, melting at about 56–57° C.

EXAMPLE 4

*N - ethyl - N - cyanoacetyl - N' - hydroxyethylurea and N-ethyl-N'-cyanoacetyl-N'-hydroxyethylurea*

A mixture of 80 g. of N-ethyl-N'-hydroxyethylurea, 61.5 g. of cyanoacetic acid and 225 ml. of acetic anhydride is heated for 2 hours at 75 to 80° C. The solvent is then removed as far as practical under 25 mm. pressure. 125 ml. of water are added and distillation resumed. The mixture of the ureas is obtained as a colorless syrup. The N - ethyl - N - cyanoacetyl - N'-hydroxyethylurea is probably the predominating isomer.

EXAMPLE 5

*1 - hydroxyethyl - 3 - ethyl - 6 - amino - 1,2,3,4 - tetrahydro-2,4-pyrimidinedione and 1-ethyl-3-hydroxyethyl - 6 - amino - 1,2,3,4 - tetrahydro-2,4-pyrimidinedione*

40 g. of the syrup obtained in the preceding example are added to 40 ml. of water and 12.7 ml. of 70% aqueous sodium hydroxide solution added gradually. The temperature is maintained below 60° C. by external cooling. Upon chilling, a crystalline deposit forms which apparently consists of a mixture predominantly of the 1-hydroxyethyl-3-ethyl-6-amino-1,2,3,4-tetrahydrohydro-2,4-pyrimidinedione and 1-ethyl-3 - hydroxyethyl - 6 - amino - 1,2,3,4 - tetrahydro - 2,4 - pyrimidinedione. The crystals are washed with cold water and recrystallized from 30 ml. of hot water. After drying for 24 hours at 80° C., 6 g. of colorless prisms are obtained melting at about 180–181° C. These crystals are soluble to 5% in cold water, and difficultly soluble in cold absolute ethanol and acetone.

EXAMPLE 6

*N-ethyl-N'-(β-hydroxypropyl)urea*

To a cooled solution of 100 g. of β-hydroxypropylamine in 400 ml. of benzene a solution of 109 g. of ethyl isocyanate in 300 ml. of benzene is added gradually with cooling to keep the temperature below 35° C. The isocyanate should be dropped into the amine solution to maintain a constant excess of the latter, and thus keep the hydroxyl group from reacting with the isocyanate. Evaporation of the benzene yields the N-ethyl-N'-(2-hydroxypropyl)urea as a syrup.

EXAMPLE 7

*N - ethyl - N - cyanoacetyl - N' - (β - hydroxypropyl)urea*

A mixture of 184 g. of N-ethyl-N'-(β-hydroxypropyl)urea, 115 g. of cyanoacetic acid and 350 ml. of acetic anhydride is heated for 2 hours at 60° C. The solvent is then removed as far as practical under 25 mm. pressure, 150 ml. of water are added and vacuum distillation resumed until the N-ethyl-N-cyanoacetyl-N'-(2-hydroxypropyl) -urea remains as a syrup, which also contains a small amount of the isomeric N-ethyl-N'-cyanoacetyl-N'-(2-hydroxypropyl) urea.

EXAMPLE 8

*1 - (β - hydroxypropyl) - 3 - ethyl - 6 - amino - 1,2,3,4-tetrahydro-2,4-pyrimidinedione*

To the syrup obtained in the previous example 150 ml. of 10% sodium hydroxide are added. The addition of 10% sodium hydroxide is then continued at a slow rate, to maintain the temperature at 30–40° C., a total of 500 ml. of 10% sodium hydroxide being used. The mixture is cooled, neutralized and filtered. The 1-(β-hydroxypropyl) - 3 - ethyl - 6 - amino - 1,2,3,4 - tetrahydro-2,4-pyrimidinedione is recrystallized from a large volume of acetone. The white crystals melt at about 168–170° C.

EXAMPLE 9

*N-isobutyl-N'-cyanoacetylurea*

7.3 g. of isobutylamine are added dropwise to a solution of 2.66 ml. of concentrated sulfuric acid in 100 ml. of water. To this mixture 8.3 g. of pulverized potassium isocyanate are added and the mixture is heated for 30 minutes on the steam bath. One half volume of ethanol is added and the precipitate of potassium sulfate is filtered off. The filtrate which contains the N-isobutylurea is concentrated in vacuo. The residue is treated with 25 ml. of acetic anhydride and 10.5 g. of cyanoacetic acid and heated at 60° C. for 2 hours. The product is concentrated as far as practical at 25 mm. pressure, then 10 ml. of water are added and distillation resumed until the N-isobutyl-N'-cyanoacetylurea forms a thick syrup.

EXAMPLE 10

*1 - isobutyl - 6 - amino - 1,2,3,4 - tetrahydro - 2,4-pyrimidinedione*

The syrup obtained in the previous example is stirred with about 70 ml. of 10% sodium hydroxide solution and boiled for a minute. Complete solution occurs. After chilling, the mixture is neutralized with acetic acid. The precipitated 1-isobutyl-6-amino-1,2,3,4-tetrahydro-2,4-pyrimidinedione is filtered, washed twice with water and recrystallized from 100 ml. of 15% ethanol using charcoal as a clarifying agent. The shining colorless crystals melt at about 271–272° C.

EXAMPLE 11

*1 - isobutyl - 3 - (γ - hydroxypropyl) - 6 - amino - 1,2,3,4-tetrahydro-2,4-pyrimidinedione*

A mixture of 12.2 g. of 1-isobutyl-6-amino-1,2,3,4-tetrahydro-2,4-pyrimidinedione and 9.5 g. of trimethylene chlorohydrin is heated in the presence of 4 g. of sodium hydroxide in a closed vessel at 120° C. for 150 minutes. The charge is filtered and washed with water. The filter cake is then dissolved in hot dilute ethanol, stirred with charcoal and filtered while hot. Upon cooling, the 1 - isobutyl - 3 - (γ-hydroxypropyl) - 6 - amino - 1,2,3,4 - tetrahydro - 2,4 - pyrimidinedione crystallizes in the form of shining, colorless crystals.

I claim:

1. An alkyl-hydroxyalkyl-6-amino-1,2,3,4-tetrahydro-2,4-pyrimidinedione of the structural formula:

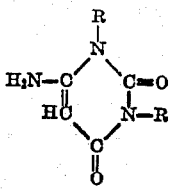

wherein one of the substituent R groups is a lower hydroxyalkyl radical and the other R group is a lower alkyl radical.

2. A 1-hydroxyalkyl-3-alkyl-6-amino-1,2,3,4-tetrahydro-2,4-pyrimidinedione of the structural formula

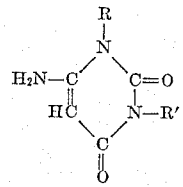

wherein R is a lower hydroxyalkyl radical and R' is a lower alkyl radical.

3. A 1-alkyl-3-hydroxyalkyl-6-amino-1,2,3,4-tetrahydropyrimidine-2,4-dione of the structural formula

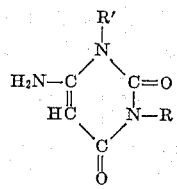

wherein R is a lower hydroxyalkyl radical and R' is a lower alkyl radical.

4. 1 - (β - hydroxyethyl) - 3 - methyl - 6 - amino-1,2,3,4-tetrahydro-2,4-pyrimidinedione.

5. 1 - (β - hydroxyethyl) - 3 - ethyl - 6 - amino-1,2,3,4-tetrahydro-2,4-pyrimidinedione.

6. 1 - (β - hydroxypropyl) - 3 - ethyl - 6 - amino-1,2,3,4-tetrahydro-2,4-pyrimidinedione.

VIKTOR PAPESCH.

REFERENCES CITED

The following references are of record in the file of this patent:

UNITED STATES PATENTS

| Number | Name | Date |
|---|---|---|
| 740,636 | Engelmann | Oct. 6, 1903 |
| 2,517,410 | Papesch | Aug. 1, 1950 |